United States Patent [19]

Sweet et al.

[11] Patent Number: 5,643,442
[45] Date of Patent: Jul. 1, 1997

[54] MEMBRANE PROCESS FOR ENHANCED DISTILLATE OR HYDROTREATED DISTILLATE AROMATICS REDUCTION

[75] Inventors: James Sweet Sweet, Unionville, Canada; Tan Jen Chen, Kingwood, Tex.; Charles P. Darnell, Baton Rouge, La.

[73] Assignee: Exxon Research and Engineering Company, Florham Park, N.J.

[21] Appl. No.: 500,126

[22] Filed: Jul. 10, 1995

Related U.S. Application Data

[63] Continuation of Ser. No. 277,452, Jul. 19, 1994, abandoned.
[51] Int. Cl.$^6$ .................................... C10G 25/00
[52] U.S. Cl. .................. 208/302; 208/310 R; 585/827; 585/831
[58] Field of Search ................................ 208/142, 302, 208/310 R; 585/827, 831

[56] References Cited

U.S. PATENT DOCUMENTS

| | | | |
|---|---|---|---|
| 3,714,022 | 1/1973 | Stiene | 208/62 |
| 4,849,093 | 7/1989 | Vauk et al. | 208/143 |
| 4,944,880 | 7/1990 | Ho et al. | 210/640 |
| 4,946,594 | 8/1990 | Thaler | 210/651 |
| 4,962,271 | 10/1990 | Black et al. | 585/819 |
| 4,990,275 | 2/1991 | Ho et al. | 210/500.39 |
| 5,294,334 | 3/1994 | Kaul et al. | 208/310 |

*Primary Examiner*—Helane Myers
*Attorney, Agent, or Firm*—Joseph J. Allocca; James H. Takemoto

[57] ABSTRACT

Distillate or hydrotreated distillate effluent is separated into an aromatics rich permeate and an aromatics lean retentate by use of a permselective membrane with the aromatic rich permeate being sent to a hydrotreater, thereby increasing the quantity of reduced aromatics content product.

7 Claims, No Drawings

MEMBRANE PROCESS FOR ENHANCED DISTILLATE OR HYDROTREATED DISTILLATE AROMATICS REDUCTION

This is a continuation of application Ser. No. 08/277,452, filed Jul. 19, 1994 and now abandoned.

FIELD OF THE INVENTION

The present invention relates to the upgrading of distillate or hydrotreater distillate effluent to produce increased yields of high quality product.

BACKGROUND OF THE INVENTION

U.S. Pat. No. 4,396,494 is directed to upgrading heavy oil by catalytic hydrotreating and solvent deasphalting. The recovered bitumen from the deasphalting step can be recycled to the hydrotreater.

EP 99141 teaches a process for the production of deasphalted oils and distillates e.g., the catalytic hydrotreatment of an asphaltene containing hydrocarbon feed mixture with the hydrotreated product being separated by distillation into one or more distillate fractions and a heavy residue. The residue is then subjected to two-stage solvent deasphalting to produce a low quality oil, a high quality oil and an asphaltic bitumen. The low quality oil and the asphaltic bitumen may be recycled to the hydrotreater.

THE PRESENT INVENTION

Increased yields of light hydrocarbon product boiling in the 150° to 450° C. range, preferably in the 200° to 400° C. range and constituting gasoline, diesel, kerosene, jet or low aromatics contents chemical stock are recovered from distillate feed or hydrotreated distillate effluent feed by the process wherein said distillate or hydrotreated distillate effluent feed is subjected to a membrane separation process in a membrane separation unit which selectively removes aromatics from the non-aromatics components of said feed producing a first aromatics rich permeate stream and a first aromatics lean retentate stream, said first aromatics lean retentate stream being recovered and sent for processing, such as fractionation into gasoline, diesel, kerosene, jet or low aromatics content chemical stock with aromaticity of less than about 25 wt % while said first aromatics rich permeate stream is sent to a hydrotreater zone wherein the aromatics present in the stream are saturated thereby producing a hydrotreated permeate effluent which is subjected to membrane separation. The hydrotreater to which the first permeate is sent can be a separate, dedicated hydrotreater, or if the feed was a hydrotreated distillate effluent, the hydrotreater to which the aromatic permeate is sent can be that same hydrotreater. If it is the same hydrotreater, then recycle first aromatics rich permeate to that hydrotreater results in an increase in the overall yield of effluent sent to the membrane separation unit and a subsequent increase in the yield of aromatics lean retentate.

All or only part of this permeate can be recycled. The portion recycled results in increased non-aromatic product yield while the portion not recycled can be sent either to blending into heating oil or sent to a cracking unit (cat cracker, fluid cat cracker or thermal cracker). Despite the high aromatics content, this material would be expected to contain crackable components yielding high octane mogas.

If the first permeate is sent to a separate hydrotreater then a second, distinct effluent, a hydrotreated permeate effluent is recovered which is sent to a membrane separation zone which may be the same or different from the aforesaid membrane separation zone. If the same, the resulting streams are treated as previously discussed. If a different membrane unit is employed, then a second retentate and a second permeate are produced, the second retentate being recovered as product while the second permeate is recycled in whole or in part to any of the aforesaid hydrotreater units or a yet another dedicated hydrotreater to produce yet another distinct hydrotreater effluent which can be sent to any of the aforesaid membrane units for production if the aforesaid permeate or retentate streams etc. It is preferred that as few separate and distinct units be employed as possible. Therefore, integration of the process so that only a single hydrotreater and a single membrane unit are employed is preferred.

Distillate feed can be a virgin or thermally/catalytically cracked distillate or distillate blend stock. The distillate feed typically ranges from 150° to 450° C. in boiling point and typically contains from 10 up to 70 wt % in aromatics.

This distillate can be subjected to hydrotreatment involving contacting the distillate with hydrogen over a catalyst.

Typically, such catalysts are comprised of at least one Group VIII metal and a Group VI metal on an inorganic refractory support, which is preferably alumina or alumina-silica. Said Groups are from the Periodic Table of the Elements, such as that found on the last page of Advanced Inorganic Chemistry, 2nd Edition 1966, Interscience Publishers, by Cotton and Wilkenson. The Group VIII metal is present in an amount ranging from about 2 to 20 wt %, preferably from about 4 to 12 wt %. Preferred Group VIII metals include Co, Ni, and Fe, with Co and Ni being most preferred. The preferred Group VI metal is Mo which is present in an amount ranging from about 5 to 50 wt %, preferably from about 10 to 40 wt % and more preferably from about 20 to 30 wt %. All metals weight percents are on support. By "on support" we mean that the percents are based on the weight of the support. For example, if the support were to weight 100 g, then 20 wt % Group VIII metal would mean that 20 g of Group VIII metal was on the support.

Any suitable inorganic oxide support material may be used for the catalyst of the present invention. Preferred are alumina and silica-alumina. More preferred is alumina. The silica content of the silica-alumina support can be from about 2 to 30 wt %, preferably 3 to 20%, more preferably 5 to 19 wt %. Other refractory inorganic compounds may also be used, non-limiting examples of which include zirconia, titania, magnesia, and the like. The alumina can be any of the aluminas conventionally used for hydrotreating catalyst. Such aluminas are generally porous amorphous alumina having an average pore size from about 50 to 200 A, preferably from about 70 to 150 A, and a surface area from about 50 to about 450 m²/g, preferably from about 100 to 300 m²/g.

As previously stated, hydrotreatment is performed in the presence of hydrogen. Either pure or plant hydrogen may be employed, so long as the stream contains at least about 50% hydrogen.

Hydrotreatment is conducted at a temperature in the range of about 200° to 400° C., preferably about 330° to 400° C., at a pressure in the range of about 250 to 2500 psig, preferably about 300 to 2000 psig, at a hydrogen treat gas rate in the range of about 500 to 8000 SCF/B, preferably about 500 to 6000 SCF/B, at a space velocity in the range 0.2 to 6 LHSV, preferably 0.3 to 1.0 LHSV.

The effluent from the hydrotreater is reduced in sulfur and nitrogen content and in metals. Hydrotreatment also effects the hydrogenation of olefinic and aromatic unsaturated materials.

This distillate or hydrotreater distillate effluent is normally employed as gasoline, diesel, jet or kerosene feed stock, as well as feed stock for other products. Because of increased environmental and health concerns very stringent specifications have or will be imposed on the aromatic content of numerous consumer products, such as gasoline, diesel, jet fuel and kerosene.

The aromatics content of the distillate or hydrotreater distillate effluent can be reduced most economically by subjecting it to selective membrane separation.

The separation of aromatics from hydrocarbon streams comprising mixtures of aromatic and non-aromatic hydrocarbons using membranes is a process well documented in the literature.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e., aromatics, unsaturated, saturated, by permeating a portion of the mixture through a non-porous cellulose ether membrane and removing permeate from the permeate side of the membrane using a sweep gas or liquid. Feeds include hydrocarbon mixtures, e.g., naphtha (including virgin naphtha, naphtha from thermal or catalytic cracking, etc.).

U.S. Pat. No. 2,930,754 teaches a method for separating hydrocarbons, e.g., aromatic and/or olefins from gasoline boiling range mixtures, by the selective permeation of the aromatic through certain non-porous cellulose ester membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation.

Compared to distillation, membrane permeation can lead to considerable energy savings. A membrane can separate a mixture of aromatics and saturates, e.g., a heavy cat naphtha, into a high-octane, mainly aromatic permeate and a high-cetane, mainly saturated retentate. Both permeate and retentate are more valuable than the starting heavy cat naphtha.

Polyurea/urethane membranes and their use for the separation of aromatics from non-aromatics are the subject of U.S. Pat. No. 4,914,064. In that case the polyurea/urethane membrane is made from a polyurea/urethane polymer characterized by possessing a urea index of at least about 20% but less than 100%, an aromatic carbon content of at least about 15 mole percent, a functional group density of at least about 10 per 100 grams of polymer, and a C=O/NH ratio of less than about 8.0. The polyurea/urethane multi-block copolymer is produced by reacting dihydroxy or polyhydroxy compounds, such as polyethers or polyesters having molecular weights in the range of about 500 to 5,000 with aliphatic, alkylaromatic or aromatic diisocyanates to produce a prepolymer which is then chain extended using diamines, polyamines or amino alcohols. The membranes are used to separate aromatics from non-aromatics under perstraction or pervaporation conditions.

The use of polyurethane imide membranes for aromatics from non-aromatics separations is disclosed in U.S. Pat. No. 4,929,358. The polyurethane imide membrane is made from a polyurethane imide copolymer produced by end capping a polyol such as a dihydroxy or polyhydroxy compound (e.g., polyether or polyester) with a di or polyisocyanate to produce a prepolymer which is then chain extended by reaction of said prepolymer with a di or polyanhydride or with a di or polycarboxylic acid to produce a polyurethane/ imide. The aromatic/non-aromatic separation using said membrane is preferably conducted under perstraction or pervaporation conditions.

A polyester imide copolymer membrane and its use for the separation of aromatics from non-aromatics is the subject of U.S. Pat. No. 4,946,594. In that case the polyester imide is prepared by reacting polyester diol or polyol with a dianhydride to produce a prepolymer which is then chain extended preferably with a diisocyanate to produce the polyester imide.

U.S. Pat. No. 4,962,271 teaches the membrane separation under perstraction conditions of a distillate to produce a retentate rich in non-aromatics and alkyl-single ring aromatics and a permeate rich in multi-ring aromatics. The multi-ring aromatics recovered in the permeate are alkyl substituted and alkyl/hetero-atom substituted multi-ring aromatic hydrocarbons having less than 75 mole % aromatic carbon. The multi-ring aromatics are 2-, 3-, 4-ring and fused multi-ring aromatics.

U.S. Pat. Nos. 4,944,880 and 4,990,275 teach polyester imide membranes and their use for the separation of aromatic hydrocarbons from feeds comprising mixtures of aromatic and non-aromatic hydrocarbons. The polyester imide membranes are described as being produced from a copolymer composition comprising a hard segment of polyimide and a soft segment of an oligomeric aliphatic polyester wherein the polyimide is derived from a dianhydride having between 8 and 20 carbon atoms and a diamine having between 2 and 30 carbon atoms and the oligomeric aliphatic polyester is a polyadipate, a polysuccinate, a polymalonate, a polyoxalate or a polyglutarate.

The process of the present invention is preferably practiced under pervaporation conditions. The feed is in either the liquid or vapor state. The process relies on vacuum or sweep gas on the permeate side to evaporate or otherwise remove the permeate from the surface of the membrane. Pervaporation process of the present invention can be performed at a temperature of from about 150° to 250° C. and higher, preferably about 200° C. and higher, the maximum temperature being that temperature at which the membrane is physically damaged.

The pervaporation process also generally relies on vacuum on the permeate side to evaporate the permeate from the surface of the membrane and maintain the concentration gradient driving force which drives the separation process. It has been discovered and is the subject of copending application U.S. Ser. No. 144,859 filed Oct. 28, 1993 in the names of Chen, Eckes and Sweet that aromatics flux and selectivity in pervaporation processes are simultaneously increased by application of pressure on the feed side of the separation membrane. An applied pressure of about 80 psi (551.6 kPa) and higher has been found effective.

The maximum temperature employed in pervaporation will be that necessary to vaporize the components in the feed which one desires to selectively permeate through the membrane while still being below the temperature at which the membrane is physically damaged. While a vacuum may be pulled on the permeate side operation at atmospheric pressure on the permeate side is also possible and economically preferable. In pervaporation it is important that the permeate evaporate from the downstream side (permeate side) of the membrane. This can be accomplished by either decreasing the permeate pressure (i.e., pulling a vacuum) if the permeate boiling point is higher than the membrane operating temperature or by increasing the membrane operating temperature above the boiling point of the permeate in which case the permeate side of the membrane can be at atmospheric pressure. This second option is possible when one uses a membrane capable of functioning at very high temperature. In some cases if the membrane operating temperature is greater than the boiling point of the permeate the permeate side pressure can be greater than 1 atmosphere. The stream containing the permeate is cooled to condense out the permeated product. Condensation temperature should be below the dew point of the permeate at a given pressure level.

The membranes can be used in any convenient form such as sheets, tubes of hollow fibers. Sheets can be used to fabricate spiral wound modules familiar to those skilled in the art.

An improved spiral wound element is disclosed in copending application U.S. Ser. No. 921,872 filed Jul. 29, 1992, wherein one or more layers of material are used as the feed spacer, said material having an open cross-sectional area of at least 30 to 70% and wherein at least three layers of material are used to produce the permeate spacer characterized in that the outer permeate spacer layers are support layers of a fine mesh material having an open cross-sectional area of about 10 to 50% and a coarse layer having an open cross-sectional area of about 50 to 90% is interposed between the aforesaid fine outer layers, wherein the fine layers are the layers in interface contact with the membrane layers enclosing the permeate spacer. While the permeate spacer comprises at least 3 layers, preferably 5 to 7 layers of alternating fine and coarse materials are used, fine layers always being the outer layers. In a further improvement an additional woven or non-woven chemically and thermally inert sheet may be interposed between the membrane and the multi-layer spacers, said sheet being for example a sheet of Nomex about 1 to 15 mils thick.

Alternatively, sheets can be used to fabricate a flat stack permeator comprising a multitude of membrane layers alternately separated by feed-retentate spacers and permeate spacers. The layers are glued along their edges to define separate feed-retentate zones and permeate zones. This device is described and claimed in U.S. Pat. No. 5,104,532.

Tubes can be used in the form of multi-leaf modules wherein each tube is flattened and placed in parallel with other flattened tubes. Internally each tube contains a spacer. Adjacent pairs of flattened tubes are separated by layers of spacer material. The flattened tubes with positioned spacer material is fitted into a pressure resistant housing equipped with fluid entrance and exit means. The ends of the tubes are clamped to create separate interior and exterior zones relative to the tubes in the housing. Apparatus of this type is described and claimed in U.S. Pat. No. 4,761,229.

Hollow fibers can be employed in bundle arrays potted at either end to form tube sheets and fitted into a pressure vessel thereby isolating the insides of the tubes from the outsides of the tubes. Apparatus of this type are known in the art. A modification of the standard design involves dividing the hollow fiber bundle into separate zones by use of baffles which redirect fluid flow on the tube side of the bundle and prevent fluid channelling and polarization on the tube side. This modification is disclosed and claimed in U.S. Pat. No. 5,169,530.

Preferably the direction of flow in a hollow fiber element will be counter-current rather than co-current or even transverse. Such counter-current flow can be achieved by wrapping the hollow fiber bundle in a spiral wrap of flow-impeding material. This spiral wrap extends from a central mandrel at the center of the bundle and spirals outward to the outer periphery of the bundle. The spiral wrap contains holes along the top and bottom ends whereby fluid entering the bundle for tube side flow at one end is partitioned by passage through the holes and forced to flow parallel to the hollow fiber down the channel created by the spiral wrap. This flow direction is counter-current to the direction of flow inside the hollow fiber. At the bottom of the channels the fluid re-emerges from the hollow fiber bundle through the holes at the opposite end of the spiral wrap and is directed out of the module. This device is disclosed and claimed in copending application U.S. Ser. No. 802,158 filed Dec. 4, 1991.

Multiple Separation elements, be they spiral wound or hollow fiber elements can be employed either in series or in parallel. U.S. Pat. No. 5,238,563 discloses a multiple-element housing wherein the elements are grouped in parallel with a feed/retentate zone defined by a space enclosed by two tube sheets arranged at the same end of the element. The central mandrels of the elements pass through the feed/retentate zone space defined by the two tube sheets and empty permeate outside the defined space into a permeate collection zone from which it is removed, while the tube sheet directly attached to the element is in open relationship to the interior of the membrane element and retentate accumulates in the space between the top tube sheet and the bottom tube sheet from which it is removed.

The preferred membranes employed in the present invention are generally described as polyester imide membranes and are described and claimed in U.S. Pat. No. 4,944,880 and U.S. Pat. No. 4,990,275.

The polyester imide membranes are made from a copolymer comprising a polyimide segment and an oligomeric aliphatic polyester segment, the polyimide being derived from a dianhydride having between 8 and 20 carbons and a diamine having between 2 and 30 carbons and the oligomeric aliphatic polyester being a polyadipate, a polysuccinate, a polymalonate, a polyoxalate or a polyglutarate. Alternately, an activated anhydride acid such as terphthalic anhydride acid chloride may be used.

The diamines which can be used include phenylene diamine, methylene dianiline (MDA), methylene di-o-chloroaniline (MOCA), methylene bis (dichloroaniline) (tetrachloro MDA), methylene dicyclohexylamine ($H_{12}$-MDA), methylene dichlorocyclohexylamine ($H_{12}$MOCA), methylene bis (dichlorocyclohexylamine) (tetrachloro $H_{12}$MDA), 4,4'-(hexafluoroisopropylidene)-bisaniline (6F diamine), 3,3'-diaminophenyl sulfone (3,3' DAPSON), 4,4'-diaminophenyl sulfone (4,4' DAPSON), 4,4'-dimethyl-3,3'-diaminophenyl sulfone (4,4'-dimethyl-3,3' DAPSON), 2,4-diamino cumene, methyl bis(di-o-toluidine), oxydianiline (ODA), bisaniline A, bisaniline M, bisaniline P, thiodianiline, 2,2-bis[4-(4-aminophenoxy) phenyl] propane (BAPP), bis[4-(4-aminophenoxy phenyl) sulfone (BAPS), 4,4'-bis(4-aminophenoxy) biphenyl (BAPB), 1,4-bis(4-aminophenoxy) benzene (TPE-Q), and 1,3-bis(4-aminophenoxy) benzene (TPE-R).

The dianhydride is preferably an aromatic dianhydride and is most preferably selected from the group consisting of pyromellitic dianhydride, 3,3',4,4'-benzophenone tetracarboxylic dianhydride, 4,4'-(hexafluoroisopropylidene)-bis (phthalic anhydride), 4,4'-oxydiphthalic anhydride, diphenylsulfone-3,3'4,4'-tetracarboxylic dianhydride, and 3,3',4,4'-biphenyl-tetracarboxylic dianhydride.

Examples of preferred polyesters include polyethylene adipate and polyethylene succinate.

The polyesters used generally have molecular weights in the range of 500 to 4000, preferably 1000 to 2000.

In practice the membrane may be synthesized as follows. One mole of a polyester, e.g., polyadipate, polysuccinate, polyoxalate, polyglutarate or polymalonate, preferably polyethylene adipate or polyethylene succinate, is reacted with two moles of the dianhydride, e.g., pyromellitic dianhydride, to make a prepolymer in the end-capping step. One mole of this prepolymer is then reacted with one mole of diamine, e.g., methylene di-o-chloroaniline (MOCA) to make a copolymer. Finally, heating of the copolymer at 260°–300° C. for about ½ hour leads to the copolymer containing polyester and polyimide segments. The heating step converts the polyamic acid to the corresponding polyimide via imide ring closure with removal of water.

In the synthesis an aprotic solvent such as dimethylformamide (DMF) is used in the chain-extension step. DMF is a preferred solvent but other aprotic solvents are suitable and may be used. A concentrated solution of the polyamic acid/polyester copolymer in the solvent is obtained. This solution is used to cast the membrane. The solution is spread on a glass plate or a high temperature porous support backing, the layer thickness being adjusted by means of a casting knife. The membrane is first dried at room temperature to remove most of the solvent, then at 120° C. overnight. If the membrane is cast on a glass plate it is removed from the casting plate by soaking in water. If cast on a porous support backing it is left as is. Finally, heating the membrane at 300° C. for about 0.5 hours results in the formation of the polyimide. Obviously, heating to 300° C. requires that if a backing is used the backing be thermally stable, such as teflon, fiber glass, sintered metal or ceramic or high temperature polymer backing.

Practice of the membrane separation step on the distillate or hydrotreated distillate effluent produces an aromatics rich permeate (the aromatics permeated including those aromatics containing heteroatoms either in side chains or within the aromatic rings themselves) and an aromatics lean hydrotreated distillate retentate. The retentate can be sent downstream and blended into the jet fuel, heating oil or the diesel pool.

The aromatics rich permeate contains significant quantities of copermeated non-aromatics. The permeate is sent to a hydrotreated or recycled to the hydrotreater (as the case may be) wherein these non-aromatics are returned to and recovered as hydrotreater effluent which is subjected to membrane separation. The aromatics and heteroatom aromatics, on being returned to the hydrotreater are subjected to the desulfurization, denitrogenation and hydrogenation action of the hydrotreater and thereby converted into additional volumes of non-aromatic distillate material of reduced sulfur and nitrogen content, which become part of and increase the yield of useable hydrotreater effluent. A slip stream of permeate may be needed to avoid buildup of aromatics.

The following non-limiting example will be helpful in understanding the present invention.

EXAMPLE 1

A sample of refinery hydrotreated distillate boiling between 417°–714° F. (210.4° C.–370.9° C.) and which was made up of a mixture of virgin and cracked distillate was subjected to aromatics pervaporation separation using a polyester-succinate membrane. The pervaporation run was conducted at a temperature of 210° C. and a 10 mm Hg pressure on the permeate side.

The membrane was made as follows:

To 1.31 g (0.006 mole) or pulverized pyromellitic dianhydride (PMDA) under N2 in a 250 ml reactor was added 5 g (0.003 mole) of polyethylene succinate (PES) diol with a molecular weight of about 1670. The reactor content was heated to 170° C. and maintained at this temperature for about 5.75 hours with stirring at 400 rpm. This completed the end-capping reaction of PES with PMDA. To the end-capping reaction product was added 20 g of dimethylformamide (DMF), and the temperature was dropped to about 70° C. with stirring for about 0.5 hour. To the reactor content was added 0.8 g (0.003 mole) of methylene di-o-chloroaniline (MOCA) in 5 g DMF solution. The solution was stirred at 70° C. for about 1.5 hours, and DMF was added to keep up with the viscosity increase of the solution during the chain-extension reaction of the end-capped product with MOCA. In this chain-extension reaction, about 206 g DMF was added, and the viscosity increase indicated the occurrence of this reaction. The solution was then cooled to room temperature. The resulting solution containing about 3 wt % of the copolymer with polyamic acid and polyethylenesuccinate segments had suitable consistency for solution casting in the preparation of membranes.

The resulting solution was centrifuged for about 5 minutes. Following centrifugation, a membrane was knife-cast onto a microporous Teflon support (Gore-Tex with a pore size of about 0.2 micron, a porosity of about 80%, and a thickness of about 50 microns) with a knife gap setting of about 24 mils. DMF was allowed to evaporate from the membrane in a nitrogen purge oven at 70° C. in a hood over a period of about 24 hours. This drying avoids the crystallization of polyethylenesuccinate segments and thus the brittleness problem of the membrane. The membrane was further dried at 120° C. for about 20 hours to remove the residual DMF solution. Finally, the membrane was cured to convert the polyamic acid to polyimide with removal of water by heating from room temperature to 260° C., maintaining at this temperature for 10 minutes, and cooling to room temperature. The resulting membrane had a thickness of about 12 microns (excluding the support).

The results are presented in Table 1 below:

| AROMATICS/NON-AROMATICS SEPARATION OF HYDROTREATED DISTILLATE BY PERVAPORATION | | | |
| --- | --- | --- | --- |
| | FEED | PERMEATE | RETENTATE |
| Yield, Wt % | — | 33 | 66 |
| Composition: | | | |
| Aromatics, wt % | 40.2 | 81.8 | 20.5 |
| Sulfur, wppm | 1145 | 1422 | 1010 |
| Nitrogen, wppm | 304 | 357 | 278 |
| Membrane Performance: | | | |
| Arom/Non-Arom Sel. | | 9.7 | |
| Sulfur/Non-Arom Sel. | | 4.9 | |
| Nitrogen/Non-Arom Sel. | | 4.6 | |

The permeate is over 80 wt % aromatics. The saturates rich retentate produced in about 66 wt % yield contains only 20 wt % aromatics, substantially reduced from the about 40 wt % of the original hydrotreated distillate. The flux obtained was about 52 kg/m$^2$ dag.

EXAMPLE 2

A laboratory run was made on a refinery sample of virgin distillate. It boils between 460°–670° F. The run was conducted at 210° C./2 mm Hg permeate pressure with polyester-succinate (PES) membrane.

The membrane used in this example was the same as in the previous example.

The results are presented in Table 2 below:

| AROMATICS/NON-AROMATICS SEPARATION OF VIRGIN DISTILLATE | | | |
|---|---|---|---|
| Stream | Feed | Permeate | Retentate |
| Yield, Wt % | — | 16 | 84 |
| Composition | | | |
| Aromatics, wt % | 24 | 66 | 16 |
| Sulfur, wppm | 1.4 | 3.5 | 1.0 |
| DBT, wppm | 933 | 3550 | 419 |
| DBDBT, wppm | 295 | 789 | 198 |
| Nitrogen, wppm | 71 | 230 | 39 |
| Membrane Performance: | | | |
| Aromatics/Non-Aromatics | | 7.7 | |
| Sulfur/Non-Aromatics | | 6.4 | |
| DBT*/Non-Aromatics | | 12.1 | |
| DBDBT**/Non-Aromatics | | 7.4 | |
| Nitrogen/Non-Aromatics | | 9.7 | |
| Flux, Kg/m$^2$ · day | | 83 | |

*DBT = DIBENZOTHIOPHENE
**DMDBT = DIMETHYL DIBENZOTHIOPHENE

As can be seen from the table, the permeate which is only 16 wt % of the feed, is enriched to 66 wt % aromatics. The bulk of the stream, 84 wt %, is retentate greatly reduced in aromatics to 16 wt % aromatics. Based on this it can be calculated that an aromatics/non-aromatics selectivity of 7.7, defined as the ratio of aromatics to non-aromatics in the permeate versus the average of the feed and the retentate, was achieved. Similarly, it was found that PES membrane has excellent nitrogen and sulfur to non-aromatics selectivity, at 9.7 and 6.4 respectively. This process has the further advantage of keeping these undesirable sulfur, nitrogen components with the aromatics further increasing the retentate distillate quality. The flux obtained with PES membrane and virgin distillate was good, at 83 Kg/m$^2$.day.

What is claimed:

1. A method for lowering the sulfur and nitrogen content while increasing the yield of light, low aromatic content hydrocarbon product boiling in the 150° to 450° C. range recovered from hydrotreated distillate effluent, said method comprising the steps of (a) subjecting said hydrotreated distillate effluent feed to a membrane separation process in a membrane separation unit which selectively separates aromatic hydrocarbons containing heteroatoms wherein the heteroatoms are nitrogen and/or sulfur from non-aromatic hydrocarbons in the feed producing a heteroatom aromatics rich permeate and a heteroatom aromatics lean retentate, (b) recovering the heteroatom aromatics lean retentate stream as a product stream (c) passing the aromatics rich permeate to a hydrotreater wherein the heteroatom rich aromatics are saturated into non-aromatics and recovered as a non-aromatics rich hydrotreater effluent, and (d) subjecting the hydrotreater effluent from step (c) to the membrane separation process of step (a).

2. The method of claim 1 wherein the heteroatom aromatics rich permeate is recovered and hydrotreated.

3. The method of claim 2 wherein the membrane separation unit employs a polyester imide membrane.

4. The method of claim 3 wherein the polyester imide membrane is made from a copolymer comprising a polyimide segment and oligomeric aliphatic polyester segment wherein the polyimide is derived from a dianhydride or activated anhydride acid having between 8 and 20 carbons and a diamine having between 2 and 30 carbons and the oligomeric aliphatic polyester is a polyadipate, a polysuccinate, a polymalonate, a polyoxalate, a polyglutarate or mixtures thereof.

5. The method of claim 4 wherein the membrane separation zone operates under pervaporation conditions.

6. The method of claim 1 wherein the heteroatom aromatics rich permeate produced by the membrane separation of hydrotreated distillate effluent feed is recycled to the same hydrotreater used to produce the hydrotreated distillate effluent feed.

7. The method of claim 1 wherein the heteroatom aromatics rich permeate produced by the membrane separation of distillate or hydrotreated distillate effluent is hydrotreated in a separate dedicated hydrotreater.

* * * * *